(12) United States Patent
Martucci et al.

(10) Patent No.: US 6,302,150 B1
(45) Date of Patent: Oct. 16, 2001

(54) HOSE ASSEMBLY / AND METHOD FOR MAKING SAME

(75) Inventors: Norman S. Martucci; Boney A. Mathew, both of Clarkston, MI (US)

(73) Assignee: Teleflex Fluid Systems, Suffield, CT (US)

( * ) Notice: Subject to any disclaimer, the term of this patent is extended or adjusted under 35 U.S.C. 154(b) by 0 days.

(21) Appl. No.: 09/240,536

(22) Filed: Jan. 29, 1999

(51) Int. Cl.$^7$ ..................................................... F16L 11/08
(52) U.S. Cl. ........................ 138/125; 138/127; 138/141; 138/137; 138/153
(58) Field of Search ................... 138/137, 131, 138/134, 118, 122, 121, 125, 177

(56) References Cited

U.S. PATENT DOCUMENTS

| | | | |
|---|---|---|---|
| Re. 35,527 | * 6/1997 | Martucci | 138/118 |
| 323,149 | 7/1885 | Holt | 138/126 X |
| 334,951 | 1/1886 | Holt | 138/126 |
| 2,690,769 | 10/1954 | Brown | 138/55 |
| 3,023,787 | 3/1962 | Phillips et al. | 138/121 |
| 4,092,897 | 6/1978 | Lalikos et al. | 87/29 |
| 4,104,095 | 8/1978 | Shaw | 156/83 |
| 4,196,031 | 4/1980 | Lalikos et al. | 138/121 X |
| 4,332,278 | 6/1982 | Lalikos et al. | 138/127 |
| 4,341,578 | 7/1982 | Chermak et al. | 156/149 |
| 4,342,612 | 8/1982 | Lalikos et al. | 138/121 X |
| 4,604,155 | 8/1986 | McKiernan | 156/287 |
| 4,836,872 | 6/1989 | Landry et al. | 156/85 |
| 4,915,139 | 4/1990 | Landry et al. | 138/125 |
| 4,952,262 | 8/1990 | Washkewicz et al. | 156/149 |
| 4,998,564 | 3/1991 | Igarashi et al. | 138/126 |
| 5,124,878 | 6/1992 | Martucci | 138/125 X |
| 5,142,782 | 9/1992 | Martucci | 138/125 X |
| 5,170,011 | 12/1992 | Martucci | 138/118 X |
| 5,192,476 | 3/1993 | Green | 264/127 |
| 5,361,806 | 11/1994 | Lalikos et al. | 138/109 |
| 5,373,870 | 12/1994 | Derroire et al. | 138/125 |
| 5,380,385 | 1/1995 | Derroire et al. | 156/149 |
| 5,381,834 | 1/1995 | King | 138/125 |
| 5,401,334 | 3/1995 | O'Melia et al. | 148/265 |
| 5,430,603 | 7/1995 | Albino et al. | 938/125 |
| 5,431,191 | 7/1995 | Neuhauser et al. | 138/137 |
| 5,483,412 | 1/1996 | Albino et al. | 138/125 |
| 5,613,524 | * 3/1997 | Martucci | 138/137 |
| 5,655,572 | * 8/1997 | Marena | 138/125 |
| 5,706,865 | * 1/1998 | Douchet | 138/125 |
| 5,901,755 | * 5/1999 | Winter et al. | 138/121 |
| 6,039,084 | * 3/2000 | Martucci et al. | 138/137 |

* cited by examiner

Primary Examiner—Patrick Brinson
(74) Attorney, Agent, or Firm—Kohn & Associates

(57) ABSTRACT

A method of making a hose assembly (10) includes the steps of disposing a reinforcing layer (14) having interstitial spaces extending therethrough about a tubular inner liner (12) and heating an outer surface (16) of the inner liner (12) to cause it to melt and disperse into the interstitial spaces of the reinforcing layer (14) and the fibers themselves to bond the first layer to the inner liner (12). A lightweight hose assembly (10) of the type adapted for conveying fuels and other corrosive fluids is also disclosed. The assembly (10) includes a tubular inner liner (12) including a melt extrudable polymeric fluorocarbon material having an external surface (16). A layer (14) having gaps extending therethrough is disposed about the inner liner (12). The inner liner (12) is dispersed into the layer (14) and bonds the layer (14) to the external surface (16) of the inner liner (12).

15 Claims, 3 Drawing Sheets

HOSE ASSEMBLY / AND METHOD FOR MAKING SAME

TECHNICAL FIELD

The subject invention relates to hose construction. More specifically, the subject invention relates to a method for constructing a hose assembly having an inner fluorocarbon polymer liner and reinforcing layer thereabout.

BRIEF DESCRIPTION OF THE RELATED ART

Hose assemblies for conveying fuel and other corrosive materials are well known in the art. Such assemblies are exposed to a variety of fuel mixtures, fuel additives, and caustic materials in addition to being exposed to extreme temperatures. Thus, such hose assemblies must be resistant to chemical, environmental, and physical degradation as a result of chemical exposure, environmental exposure to heat, and physical degradation resulting from bending and repeated movement or forces applied to the assembly.

Polymeric fluorocarbon materials such as polytetrafluoroethylene possess the requisite chemical and temperature resistant properties for most fuel hose applications. Unfortunately, polymeric fluorocarbon materials exhibit relatively poor tensile and hoop strengths. As a consequence, such fluorocarbon materials are prone to kinking. Such kinking remains permanent and provides a continual resistance to the fluid flow through the hose assembly. Moreover, as a result of a fluorinated material's low tensile strength, attachment or securing of coupling members to the hose assembly is substantially compromised.

Various approaches have been described for offering additional strength to a polymeric fluorocarbon liner. One approach involves braiding fibers about the inner fluorocarbon liner. The braided fibers offer additional strength to the fluorocarbon liner resulting in a hose assembly that resists kinking. Examples of such approaches are disclosed in U.S. Pat. No. 5,124,878 issued Jun. 23, 1992, U.S. Pat. No. 5,142,782, issued Sep. 1, 1992, and U.S. Pat. No. 5,192,476 issued Mar 9, 1993, all assigned to the assignee of the subject invention.

The hose assembly described in the '878 patent includes an inner fluorocarbon polymeric liner, a braided reinforcing layer disposed about the exterior of the inner liner, and is characterized by including an organic polymeric material dispersed in the reinforcing layer which connects the reinforcing layer to the inner liner thereby providing a hose assembly which is stronger and more kink resistant.

Both the '782 and '476 patents disclose methods for producing a hose assembly of the type shown in the '878 patent. The '782 patent discloses a method of making a lightweight hose assembly including the steps of extruding an inner liner, applying a braided reinforcing material having gaps extending therethrough about the inner liner. The inner liner and the braided layer are then passed through a reservoir containing a solution of a fluorocarbon polymer. After the solvent is removed, the fluorocarbon polymer coating is dispersed throughout the braided layer and bonds the braided layer to the inner fluorocarbon liner.

The '476 patent discloses a method of forming a hose assembly in which an inner liner of a fluorocarbon material is extruded and then passed through a reservoir containing a dispersion including a fluorocarbon polymer material. A reinforcing layer is then braided about the exterior of the inner liner to form a braided layer having the dispersion thereabout such that the dispersion penetrates the interstitial spaces of the braided layer. Subsequently, the assembly is heated to remove the solvent and the braided reinforcing layer is then bonded to the fluorocarbon polymer inner liner.

The methods disclosed in the '782 and '476 patents yield a highly desirable and excellent performing hose assembly, however, the steps of applying the fluorocarbon polymer dispersion to the inner liner can allow some of the fluorocarbon polymer dispersion to enter the interior of the hose where it may cause problems when the hose assembly is used in a desired application. Additionally, the hose assemblies discussed above preferably utilize non-melt extrudable fluorocarbon polymers for the inner liner. These non-melt extrudable fluorocarbon polymer materials typically possess a higher permeation rate than do melt extrudable fluorocarbon polymer materials. That is, the ability of volatile fluids or gases to escape through the wall of the inner liner is greater with non-melt extrudable fluorocarbon based hose assemblies. Additionally, non-melt extrudable fluorocarbon materials are not as easily adapted to recycling or reuse of the material as are melt-extrudable fluorocarbon materials.

An additional example of strengthening an inner fluorocarbon liner with an outer liner while also increasing flexibility is shown in U.S. Pat. No. 3,023,787 to Phillips et al. The Phillips et al. patent discloses a convoluted hose assembly having a fluorocarbon inner liner constructed of many layers of helically wrapped Teflon® tape. Convoluted hoses are typically employed because they provide flexibility to a fluorocarbon hose assembly, however, convoluted hose assemblies have inherent weaknesses. A reinforcing strip consisting of reinforcing fibers coated with a plastic material is wrapped about the inner layer to provide additional strength to the assembly due to the inherent weakness of wrapped convoluted core construction. In its final assembly, a metal braid is applied to the outside of the hose assembly to impart greater strength.

Hose assemblies of the type described in the Phillips et al. patent have several inherent drawbacks. First, because the inner liner is formed by helically wrapping layers of a fluorocarbon tape, it requires a greater amount of fluorocarbon material to be utilized in order to construct the inner liner which adds to both the cost of constructing the hose assembly and to the labor intensity of constructing the hose assembly. Other drawbacks associated with hoses of the type disclosed in the Phillips et al. patent includes failure of seams created by helically wrapping layers of Teflon® tape. These failures occur due to inherent weaknesses in bonding the seams created by the overlapping layers of tape which, under internal pressures and prolonged movement are prone to leakage or to bursting. In addition, the seams create undulations within the inner liner which cause disruption in the flow of liquids therein which could give rise to increased electrical charge buildup within the hose.

Therefore, it would be desirable to have a method for constructing a fluorocarbon hose assembly which eliminates the necessity for liquid fluorocarbon polymer dispersions in order to bond reinforcing layers to a fluorocarbon liner.

Further, it would be desirable to have a hose assembly which includes a polymeric fluorocarbon inner liner which is resistant to kinking while additionally possessing greatly increased bending properties while maintaining the overall integrity of the hose assembly.

SUMMARY OF THE INVENTION AND ADVANTAGES

In accordance with the present invention, there is provided a method for constructing a hose assembly. The method includes the steps of disposing a reinforcing layer having interstitial spaces extending therethrough about a tubular inner liner and dispersing the tubular inner lines into the interstitial spaces and bonding the reinforcing layer to the inner liner.

Additionally, accordingly to the present invention, there is provided a hose assembly including an extruded, smooth bore tubular inner liner including a melt extrudable polymeric fluorocarbon material having an external surface and a reinforcing layer having gaps extending therethrough disposed about the external surface. The external surface of the inner liner is dispersed into the reinforcing layer and bonds the reinforcing layer to the external surface of the inner liner.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
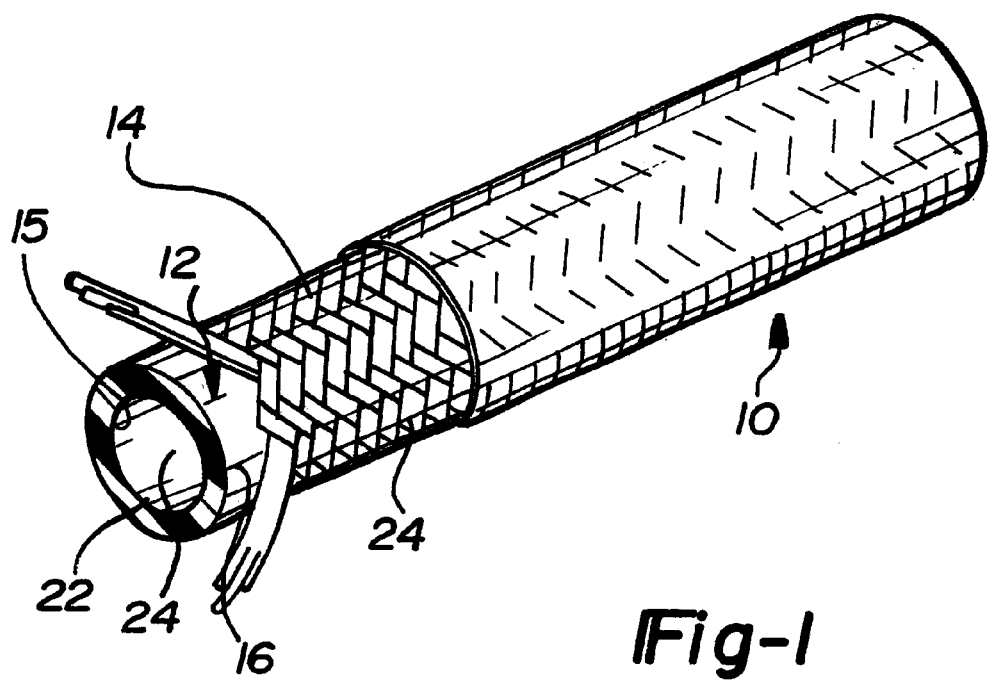
FIG. 1 is a perspective view of the preferred embodiment of the present invention.

A hose assembly made in accordance with the present invention is generally shown at 10 in FIG. 1. The assembly 10 includes a tubular inner liner 12 and a reinforcing layer 14 disposed about the inner liner 12. A coupling means 20 adapted to engage the ends of the hose assembly 10 may be included.

Figure 2:
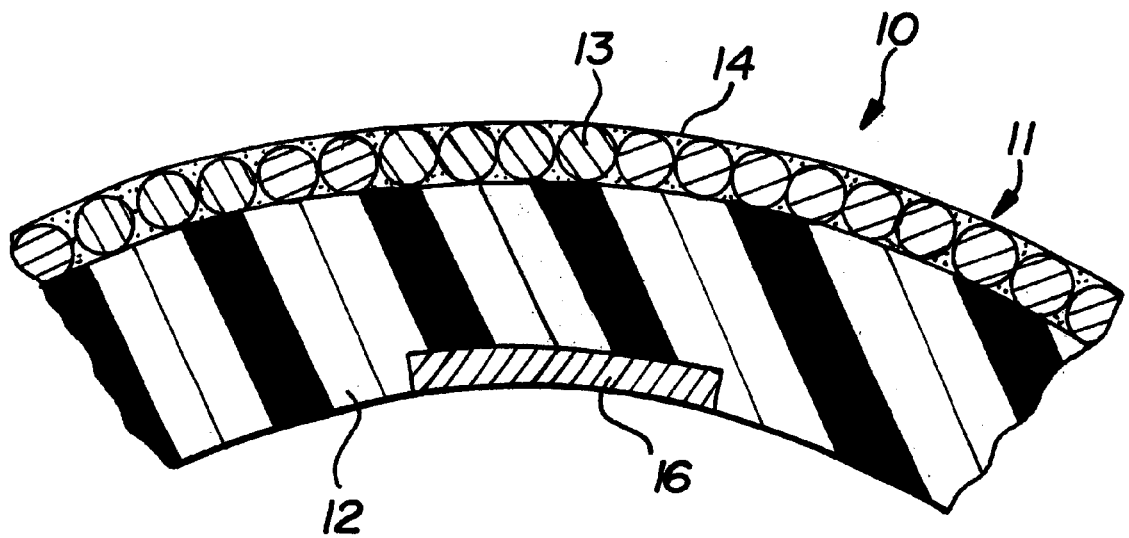
FIG. 2 is an enlarged sectional view of the hose assembly.
Figure 3:
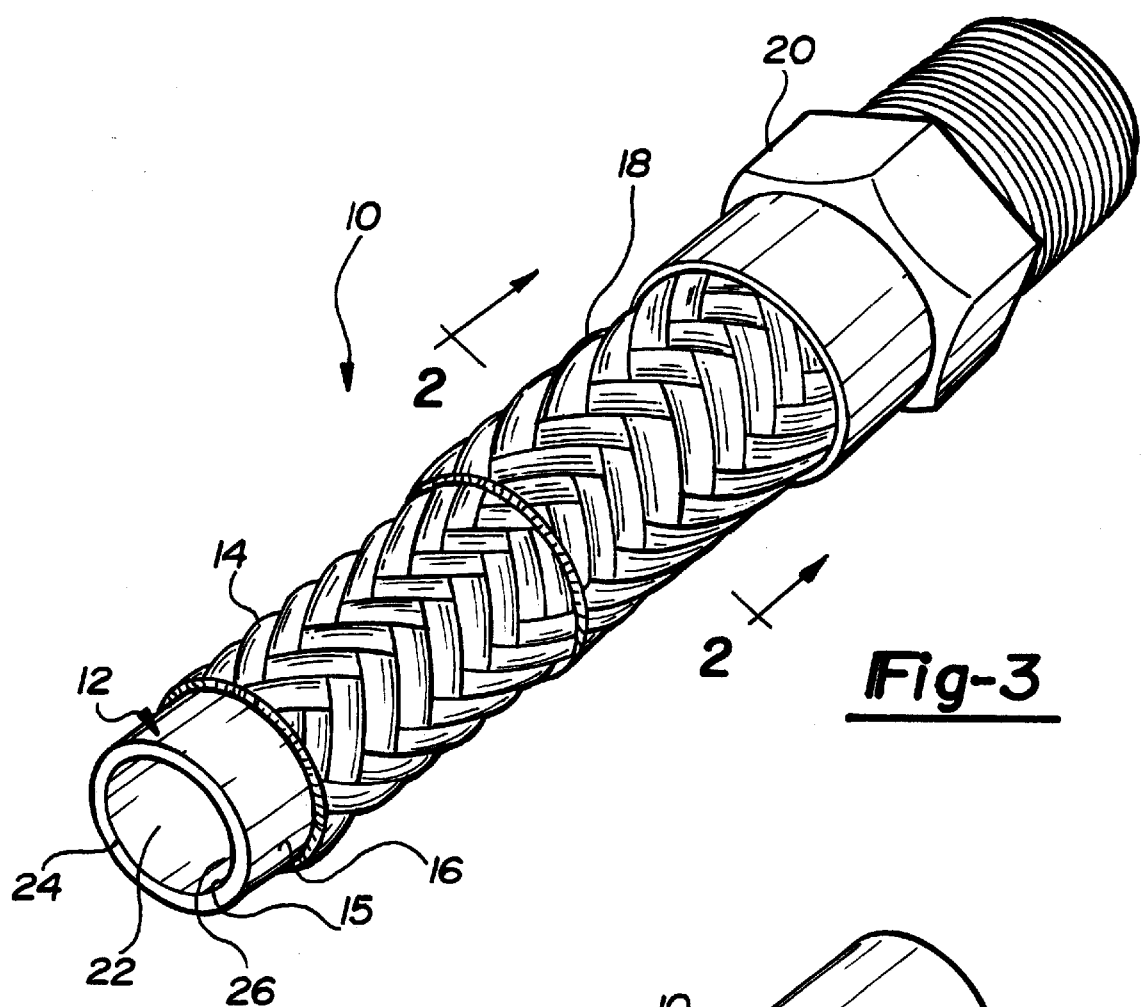
FIG. 3 is a perspective view of an alternative embodiment of the present invention.
Figure 4:
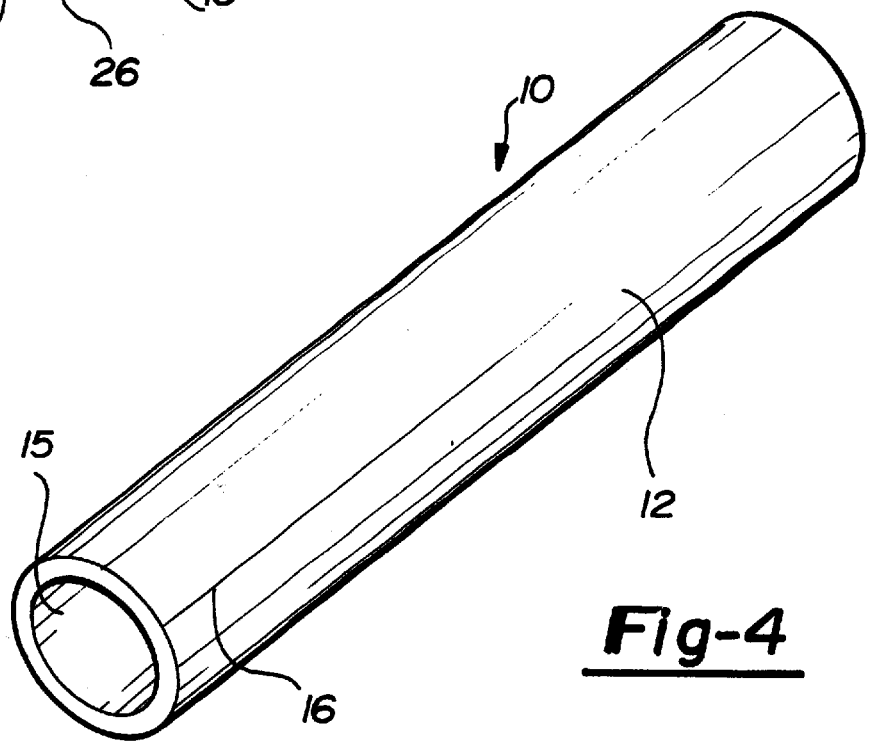
FIG. 4 is a perspective view of the extrusion of the inner liner of the method of the preferred embodiment of the present invention.
Figure 5:
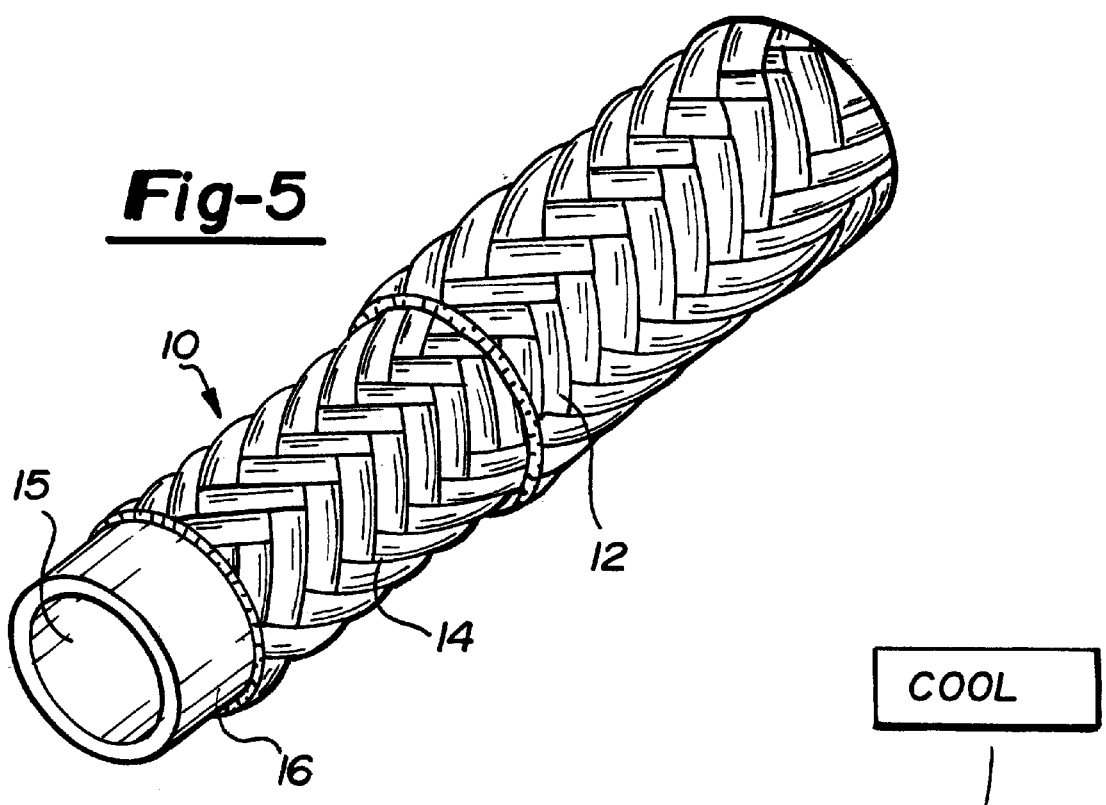
FIG. 5 is a perspective view of the hose assembly having a hose attached thereto.
Figure 6:
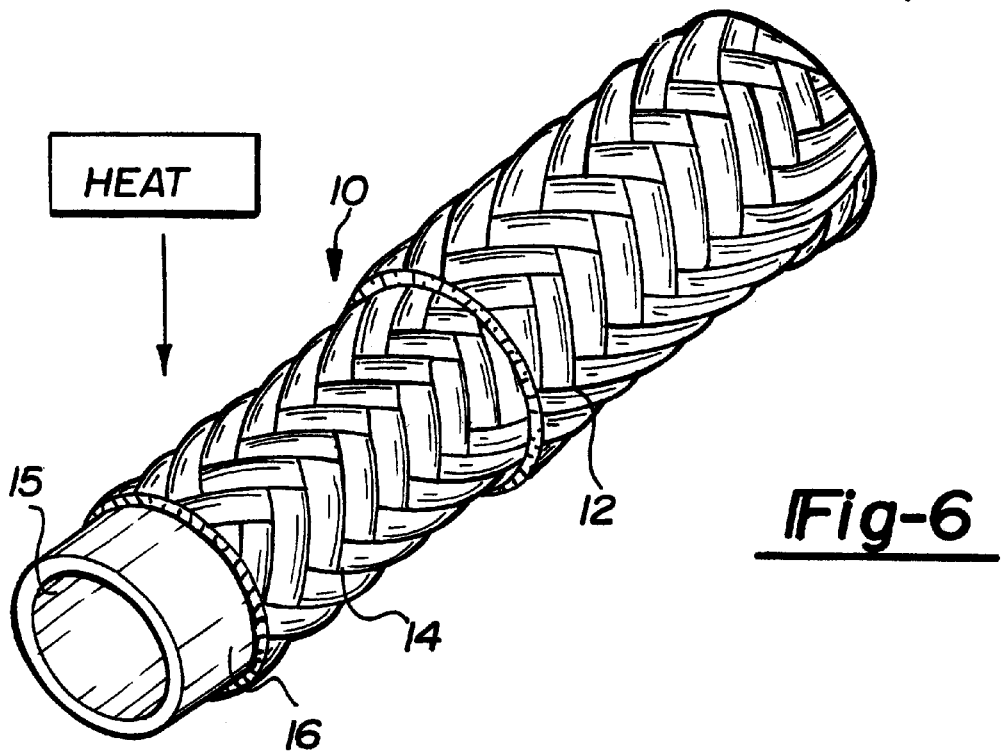
FIG. 6 is a perspective view of the hose assembly with the administration of both heating and cooling elements to ensure adhesion of the braid layer.

The tubular inner layer 12, as best shown in FIGS. 1 and 2, includes a melt extrudable polymeric fluorocarbon material resistant to both chemical and heat degradation, thus allowing a variety of fluids, particularly automotive fuels and fuel additives, e.g., detergents, alcohols, etc., to pass through the inner liner 12 without corroding or degrading the inner liner 12. The inner liner 12 is preferably extruded using well known melt or paste extrusion techniques and has a wall thickness between 0.001 and 0.120 inches. The walls of the inner liner 12 define an inner surface 15 and an interior passageway 22 of the inner liner 12. Although the inner liner 12 may be made of any number of polymeric fluorocarbon materials, the inner liner 12 is preferably made from a melt extrudable fluorocarbon polymeric material including perfluorinated ethylene-propylene (FEP), copolymer of tetrafluoroethylene and hexafluoropropylene sold under the trademark TEFLON® FEP by DuPont, perfluoroalkoxy fluorocarbon resins (PFA), the copolymer of tetrafluoroethylene-perfluorovinyl ether sold under the trademark TEFLON® PFA by DuPont, or the copolymer of ethylene tetrafluoroethylene (ETFE) sold under the trademark TEFZEL by DuPont. In addition to the aforementioned polymeric fluorocarbon materials, any other melt extrudable fluorocarbon polymeric materials known to those skilled in the art can be used. Aside from the manufacturing benefits detailed herein, utilizing melt extrudable materials allows for any scrap melt extrudable material to be remelted and thereby recycled within the manufacturing facility. Another benefit of utilizing a melt extrudable inner liner 12 is that it lowers the permeation rate of gas and/or liquids through the hose assembly 10. Paste extrudable fluoroplastic such as PTFE, during sintering process, may have voids which in turn may have higher permeation.

The liner 12 is extruded to provide an inner liner 12 which has a smooth bore, free of undulations and seams which can cause turbulence of fluid flow within the inner liner 12. Turbulence can cause build-up of electrical charge within the hose assembly which is undesirable in the situation where potentially flammable fluids are being transported therethrough. Extruding the inner liner 12 creates an inner liner 12 which as no seams and undulations and is, therefore, the preferred method for forming the inner liner 12.

By melt extrudable fluorocarbon polymeric material, it is meant that the material, at suitable conditions such as raised temperature, can be caused to melt or flow such that the fluorocarbon material flows about the reinforcing layer 14 and substantially encapsulates the reinforcing layer 14 whereupon cooling of the fluorocarbon material, the inner liner 12 and the reinforcing layer 14 are bond to one and other forming an integral hose assembly.

The assembly 10 includes the reinforcing layer 14 having gaps extending therethrough. Generally, the reinforcing layer 14 is constructed of a braided or woven material. Because the inner liner 12 is made of a melt extrudable material, it allows for the use of monofilament braid material for the reinforcing layer 14 which is significantly less expensive than multifilament braid material. The layer 14 can comprise any non-metallic material disposed in interleaving fashion or wrapped tightly about the inner liner 12. The material that the layer 14 is constructed of is generally a braid or weave of interlocking fibers which create gaps or interstitial spaces which facilitate the connection of layer 14 to the inner liner 12. Preferably, the material used for the layer 14 is glass fiber such as fiberglass. Glass fibers provide the necessary strength needed to reinforce the inner liner 12 and are heat resistant which is important for use in high temperature environments. The layer 14 adds tensile strength to the hose assembly 10, and the layer 14 imparts increased hoop strength to the hose assembly 10.

In a preferred embodiment, the glass fibers are tightly woven such that the gaps and spaces between the adjacent fibers are minimized.

The glass fibers are preferably woven at a neutral braid angle. This angle is preferred since there is no movement of the hose under internal pressure in either the longitudinally or diametrically. It is preferred that the braid angle is as close to the neutral angle as possible. However, variations in materials, selection of reinforcing fiber material, and the machines used to apply the braid in part some variation.

The reinforcing layer 14 is preferably applied about the exterior of the inner liner 12 by utilizing a braiding machine well known in the art. The machine includes a plurality of spools which carry the fiber material. The fibers are fed through the machine to a braiding area. In the braiding area, the fibers are braided or wound about the inner liner 12 to form the braided reinforcing layer 14. Alternatively, the braided reinforcing layer 14 also can be constructed in a pre-made, sock-like fashion and then can be applied about the exterior of the inner liner 12.

Due to the chemical inertness and general lubricious nature of polymeric fluorocarbon materials, relative movement between inner and outer concentric polymeric fluorocarbon liners is often encountered in prior art hose assemblies. This relative movement leads to weakness in the final hose assembly. The present hose assembly 10 is modified to eliminate such relative movement between the inner liner 12 and the layer 14.

The hose assembly 10 is constructed such that the melt extrudable fluorocarbon material which forms the inner liner 12 also bonds the reinforcing layer 14 to the inner liner 12 to form an integral assembly and thereby eliminate relative movement between the inner liner and the reinforcing layer 14.

As stated above, the inner liner 12 is constructed of a material, which, when heated to a desired temperature, 500° F.–750° F., the external surface 16 of the inner liner 12 melts and flows into the gaps or interstitial spaces of the reinforcing layer 14 and about the fibers which comprise the braided material to form a mechanical bond which integrally forms the reinforcing layer 14 to the inner liner 12. That is, heat is applied to the external surface 16 of the inner liner 12 by a mechanism such as a forced air heating unit.

The material comprising the inner liner 12 is heated such that substantially only the external surface 16 becomes fluid enough to flow into and about the reinforcing layer 14. Heating of the external surface 16 is controlled in a manner which does not allow the inner surface 15 of the inner liner 12 nor substantially all of the wall thickness of the inner liner 12 to become heated enough to become fluid, melt, or deformed.

In order to further control the bonding of the layer 14 to the inner liner 12, the interior passageway 22 of the inner liner 12 can be pressurized and/or cooled to prevent the interior passageway 22 and inner surface 15 of the inner liner 12 from becoming deformed or imprinted with the braid pattern of the layer 14. By maintaining a positive pressure in the interior passageway 22 of the inner liner 12 during the heating of the external surface 16, uniformity of the inner liner 12 can be controlled and/or maintained. The internal pressure is preferably in the range of 1–100 psi.

Bonding of the layer 14 to the inner liner 12 can also be enhanced by cooling the interior 22 of the inner liner 12 while applying heat thereto. The interior 22 of the inner liner 12 can be cooled by, for example, passing a fluid, or gas having a temperature lower than the melting temperature of the particular melt extrudable fluorocarbon material, through the interior 22 of the inner liner 12. The cooling fluid can be a gas, a liquid or any other fluid or combination of fluids suitable for this purpose. For example, the fluid can be air or water.

Generally, the fluid is chosen such that it is compatible with the desired melt extrudable fluorocarbon material and such that it will not cause problems if residual cooling fluid is left in the hose assembly 10. The temperature range for the cooling fluid can range from −40° F.–200° F. using fluids such as nitrogen, helium, etc.

The coolant can also be applied under pressure, as described above, to accomplish simultaneous heating of the exterior 16 of the liner 12, and cooling of the interior 22 of the inner liner 12. An example, air or water maintained at a temperature less than the melting temperature of the melt extrudable polymer can be pressurized to a pressure (eg. 50 ps.) sufficient to maintain the integrity and dimension of the inner liner 12 while simultaneously preventing the flow or melting of the inner surface 15 of the inner liner 12.

The hose assembly 10 is then subsequently sintered at a suitable temperature (approximately 700° F.) to cure the fluorocarbon polymer material dispersed throughout the layer 14. The sintering operation fuses the fluorocarbon polymer material of the inner liner 12 to both the layer 14 and the inner liner 12.

The bond between the layer 14 and the inner liner 12 prevents slippage, i.e., relative longitudinal or rotational movement between the inner liner 12 and the layer 14. That is, the material melted from the inner liner 12, disperses throughout the layer 14 and mechanically bonds the layer 14 to the inner liner 12 thereby providing strength to the inner liner 12 upon bending of the hose assembly 10. Thus, by using a melt extrudable polymeric fluorocarbon inner liner 12 which is dispersed throughout the layer 14, a hose assembly 10 is produced which results in the hoop strength of the inner liner 12 being increased such that the inner liner 12 can be bent without kinking. Further, bonding together the inner liner 12 and the layer 14 allows the hose assembly 10 to operate at higher working pressures and, therefore, to accommodate fluids transported under greater pressures.

An optional metallic braided outer liner or painted layer 18, as best shown in FIGS. 1 and 2, can be disposed about the layer 14. The metallic braided layer 18 includes a metallic material for increasing the strength and flexibility of the hose assembly 10. More specifically, the metallic outer layer 18 allows the inner liner 12 to be bent to smaller radii without kinking. The outer metallic layer 18 provides strength to the inner liner 12 upon bending. This is commonly referred to as hoop strength. Thus, by disposing the outer metallic layer 18 about the layer 14 and the inner liner 12, the hoop strength of the inner liner 12 is increased, thus improving the bend radius of the hose assembly 10. Improvement in the bend radius allows the hose assembly 10 to be manipulated or placed into configurations which would impinge or kink the inner liners of prior art hose assemblies. That is, the metallic outer layer 18 allows for a reduction in the static bend radius of the hose assembly 10 thereby allowing the hose assembly 10 to be utilized in a greater number of applications. Additionally, the metallic outer layer 18 adds to the burst strength of the hose assembly. The metal outer layer 18 allows the hose assembly 10 to be used in applications where the hose assembly 10 is operated at much higher operating pressures without bursting of the hose assembly 10. Further, the metallic outer layer 18 provides for more positive affixation of couplings or end fittings 20 to the hose assembly 10 as shown in FIG. 1. The metallic outer layer 18 additionally increases the tensile strength that the hose assembly 10 sufficiently to fixedly connect the coupling member 20 (FIG. 1) to the hose assembly 10.

The outer metallic layer 18 can be made of any suitable metal material. In the preferred embodiment of the hose assembly 10, the outer layer 18 is made from stainless steel. The metallic outer layer 18 is preferably braided in place over the reinforcing layer 14. The metallic braided outer layer 18 is preferably applied about the exterior of the reinforcing layer 14 by utilizing a braiding machine well known in the art. The machine includes a plurality of spools which carry appropriately sized stainless steel wire material. The stainless steel wire is fed through the machine to a braiding area. In the braiding area, the wires are braided or wound about the exterior of the reinforcing layer 14. Alternatively, the metallic braided layer 18 also may be constructed in its entirety in a sock-like fashion and then applied about the exterior of the reinforcing layer 14. Unlike the layer 14, the metallic braided outer layer 18 is not bonded to any of the underlying structure. That is, the braided metallic outer layer 18 is not affixed to the underlying hose assembly. The braided layer 18 can be applied utilizing a braiding machine which is commonly known as a maypole braider or may be applied using a rotary braider which is commonly known in the art. Each machine applies the braid differently, however, achieve the same results, that is, a Z over Z, construction.

As fluid flows through the inner liner 12, electrical charges can build up throughout the length of the inner liner 12. In order to prevent these electrical charges from accumulating, the inner liner 12 can include an integral longitudinal conductor 20 co-extensive with the length of the inner liner 12 for conducting an electrical charge along the length of the inner liner 12. The integral conductor 24 includes a conductive strip 24 of carbon black, as shown in FIGS. 1 and 2. The integral conductor can also be interspersed throughout the inner liner 12 by intermixing carbon black 26 throughout the polymeric fluorocarbon material either while the inner liner 12 is extruded or prior to the extrusion of the inner liner 12 as shown in the Figures.

The hose assembly 10 can further include a coupling 20 as shown in FIG. 1. The coupling is adapted to engage the ends of the hose assembly 10 for interconnecting the hose assembly 10 to a flow of fluid, e.g., fuel flow to and from a fuel tank (not shown). Couplings suitable for use with the hose assembly 10 of the present invention are well known in the art. Typically, the couplings 20 are adapted to engage the ends of the hose assembly 10. Typically, the couplings are adapted by way of barbs which engage the inner surface 15 of the inner liner 12.

The coupling 20 can also include an engaging portion (not shown) extending longitudinally from the insert portion for engaging a fitting (not shown). The engaging portion can comprise a male threaded member 28 or female threaded member (not shown). The engaging portion can comprise any configuration that will cooperate with the member to which it is connected with. For example, the engaging portion can comprise a socket to receive a mating ball joint (not shown).

Alternatively, the coupling 20 can be molded, such as by injection molding, to the hose assembly (not shown). The melt extrudable material allows for plastic fittings to be molded directly onto the hose assembly 10 thereby eliminating crimping, and its associated disadvantages, as the preferred method of affixing fittings to the hose assembly 10. This makes it possible to eliminate the separate operations of hose manufacturing, fitting manufacturing, and fitting attachment to the hose by allowing the fitting to be directly formed (molded), affixed, and sealed to the hose assembly.

Additionally, the coupling 20 can be any other well known type of the coupling known to those skilled in the art.

Throughout this application various publications are referenced by citation or number. Full citations for the publication are listed below. The disclosure of these publications in their entireties are hereby incorporated by reference into this application in order to more fully describe the state of the art to which this invention pertains.

The invention has been described in an illustrative manner, and it is to be understood the terminology used is intended to be in the nature of description rather than of limitation.

Obviously, many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

What is claimed is:

1. A hose assembly (10) comprising: an extruded, smooth bore tubular inner liner (12) comprising a melt extrudable polymeric fluorocarbon material having an external surface and a reinforcing layer (14) having gaps extending therethrough disposed about said external surface (12), said inner liner (12) being dispersed by heating directly into said reinforcing layer (14) and bonding said reinforcing layer (14) to said external surface of said inner liner (12).

2. An assembly (10) as set forth in claim 1, wherein said assembly is free of additional polymeric fluorocarbon dispersions.

3. An assembly as set forth in claim 1 characterized by a reinforcing layer (18) disposed about said reinforcing layer (14) for increasing the strength and bending properties of said hose assembly (10).

4. An assembly (10) as set forth in claim 2 further characterized by said reinforcing layer (14) having an outer periphery, said inner liner (12) extending from the outer periphery of said reinforcing layer (14) radially inwardly toward said inner liner (12).

5. An assembly (10) as set forth in claim 1 further characterized by said reinforcing layer (14) including a tightly wound non-metallic material.

6. An assembly (10) as set forth in claim 5 further characterized by said non-metallic material including one from the group consisting essentially of glass fiber, aramid, PVDF, and PPS fiber.

7. An assembly (10) as set forth in claim 1 further characterized by said reinforcing layer (18) including a metallic material.

8. An assembly (10) as set forth in claim 7 further characterized by said metallic material including stainless steel.

9. An assembly (10) as set forth in claim 1 further characterized by said melt extrudable polymeric fluorocarbon material including perfluorinated ethylene-propropylene.

10. An assembly (10) as set forth in claim 1 further characterized by said melt extrudable polymeric fluorocarbon polymer including perfluoralkoxy.

11. An assembly (10) as set forth in claim 1 further characterized by said melt extrudable polymeric fluorocarbon material including perfluoralkoxy fluorocarbon resin.

12. An assembly (10) as set forth in claim 1 further characterized by said melt extrudable polymeric fluorocarbon material including one from the group consisting essentially of a polymer of ethylenetetrafluoroethylene, PVDF and THU.

13. An assembly (10) as set forth in claim 1 further characterized by said inner liner (12) including an integral conductive (24) means coextensive with the length of said inner liner (12) for conducting electrical charges along the length of said inner liner (12).

14. An assembly (10) as set forth in claim 3 further characterized by said integral conductive means (24) including carbon black.

15. An assembly (10) as set forth in claim 1 further characterized by including
coupling means (20) adapted to engage the ends of said hose assembly (10) for interconnecting said hose assembly (10) to a flow of fluid.

* * * * *